Aug. 7, 1951     R. G. WINNICK     2,562,976
LAMINATED COMPOSITE BODY OF AIRFOIL SHAPE
Filed Feb. 27, 1948
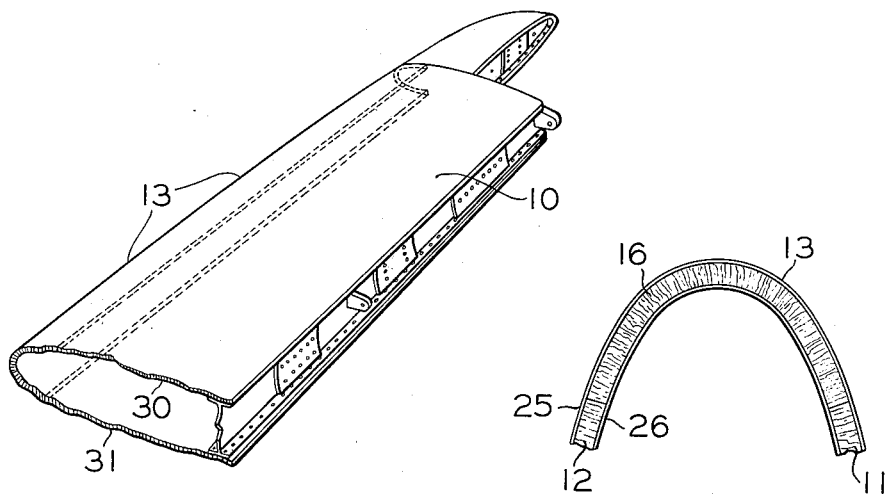
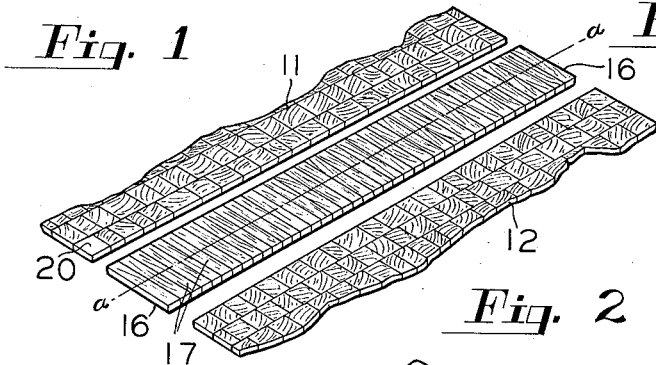
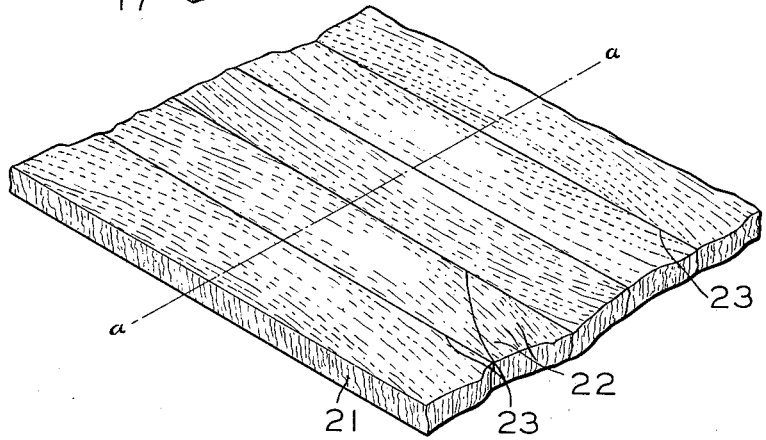
INVENTOR.
Raymond G. Winnick
BY
M. B. Tasker
ATTORNEY Patented Aug. 7, 1951

2,562,976

UNITED STATES PATENT OFFICE 2,562,976

LAMINATED COMPOSITE BODY OF AIRFOIL SHAPE

Raymond G. Winnick, Bridgeport, Conn., assignor to United Aircraft Corporation, East Hartford, Conn., a corporation of Delaware Application February 27, 1948, Serial No. 11,425

7 Claims. (Cl. 154—45.9)

1

This invention relates to improvements in laminated composite structures and has particular reference to lightweight rigid structures of this type having bent surfaces of short radii, such as leading edge sections for airplane wings, stabilizers and the like.

A preferred composite laminated panel and the method of making the same is fully described in Patent No. 2,479,342 dated August 16, 1949, and assigned to the assignee of the present invention. In using such panels in the fabrication of airfoil sections difficulty is encountered when sharp bends are made because of the occurrence of distortions, wrinkles, or ruptures due to stress concentrations in the bend area.

It is an object of this invention to provide an improved construction for a laminated panel having a built-up core which enables the panel to be sharply bent into airfoil shapes.

Another object of the invention is to provide an improved laminated assembly, or sandwich, including spaced surface sheets and an intermediate core of fibrous material of end grain structure, i. e., a panel in which the fibers of the core run substantially normal to the major surfaces of said sheets, and which is capable of being fabricated into structures having bends therein of short radii without distortions, wrinkles, or ruptures in the bend area.

A further object of this invention is to provide a construction for a laminated panel of this sort which is capable of being bent to produce the leading edge structure of an airplane wing or the like and in which a smooth exterior surface is obtained in the vicinity of the bend to form a very rigid structure capable of resisting deformation under severe loading.

Another object of this invention is to provide a panel having a plurality of adhesively connected end grain wood core pieces, in which the core pieces in the vicinity of the bend axis are so arranged that the bond lines between these pieces and the annual growth lines in these pieces are transversely disposed with respect to the bend axis.

More specifically it is an object of this invention to provide a sharply bent laminated panel of this general type having the annual growth lines in adjacent core pieces in the vicinity of the bend and the bond lines between said pieces arranged substantially parallel to each other and transverse to the bend line, and preferably substantially perpendicular to the bend line.

A still further object of this invention is to provide an improved composite wood and metal

2 assembly for aircraft resulting in exceptionally smooth outer surfaces regardless of the degree of curvature of the assembly.

These and other objects of the invention will become apparent from the following detailed description of the accompanying drawings which illustrate a preferred method of making composite wood and metal panels that can be sharply bent.

In these drawings, wherein similar reference characters refer to similar parts throughout the several views, Fig. 1 is a perspective view of a typical airplane airfoil assembly constructed in accordance with this invention;

Fig. 2 is an exploded perspective view of the core material of a composite panel specifically indicating the preferred construction in the bend line area;

Fig. 3 is an enlarged perspective view of a section of the wood core material used in the bend line area of a typical panel in which it is shown that the annual growth lines of the wood are substantially parallel with the bond lines between the wood blocks and are substantially perpendicular to the bend axis a—a; and Fig. 4 is a cross section of a leading edge of an airfoil section constructed from a panel in accordance with this invention.

Fig. 1 generally indicates an airplane airfoil assembly utilizing a composite wood and metal panel which has been molded to form an upper surface 30, a lower surface 31 and a leading edge 13 having a sharp radius of curvature.

Normally a composite wood and metal panel, or sandwich, of the type shown herein comprises a flat core sheet 11, 12 (Fig. 2) having relatively thin surface sheets 25 and 26 (Fig. 4) adhesively bonded thereto on opposite sides. The core may comprise any lightweight fibrous material such as balsa wood and the surface sheets 25 and 26 may be of high strength synthetic materials or of metal. The thickness of the core sheet and the thickness of the surface sheets will vary widely with the use for which the panel structure is designed but is generally dependent upon strength versus weight requirements.

Superior bonds between a balsa wood core and aluminum sheets can be obtained, for example, by coating the metal surfaces to be bonded with a layer of adhesive of a type which possesses a strong affinity for metal. Such adhesive coatings are then either dried or cured following which a layer of another adhesive which possesses marked affinity for wood and also for the cured adhesive on the metal is applied over the cured adhesive on the metal sheets. A coating of the second type adhesive may also be applied to the surface of the wood core to which the sheets are to be bonded. The final step of this bonding process consists of placing the assembled structure under proper temperature and pressure and for varying lengths of time to insure intimate contact of the surfaces consistent with the type of core and bonding material being utilized. A more complete description of this preferred method of bonding the core sheet and the surface sheets at proper temperature and pressure is fully described and claimed in Patent No. 2,479,342 mentioned above.

The core sheet is built up of a plurality of adhesively connected sections, herein shown as rectangular sections 20, of balsa wood having a thickness along the length of the grain equal to the desired space between the surface sheets. Similarly constructed core sheets 11 and 12 may be used where the panels to be constructed are molded in relatively flat or slightly curved sections.

This invention is concerned with laminated structures of the type above discussed in which sharp bends occur. Where a sharp radius of curvature is anticipated, a novel core section 16 is inserted in the bend area along the bend axis a—a. As better seen in Fig. 3, the core section used in the bend area is composed of rectangular core pieces 17 which are bonded together to form a core section of the desired size and thickness. It will be understood that in accordance with the usual practice in cutting trees into lumber, each of the rectangular core sections will contain a portion of the tree's concentric annular growth rings and because the core pieces are cut across the grain, the growth rings will be apparent on the major surface of the pieces as indicated by the numeral 22 in Fig. 3. These rectangular pieces are meticulously chosen and located relative to the bend axis a—a so that, in addition to having the end grain 21 abutting the outer metal surfaces, their annual growth lines 22 will be transverse to the bend axis a—a and preferably substantially perpendicular to said axis. The bonding lines 23 are also arranged so as to be substantially perpendicular to the bend axis a—a. Preferably a higher density balsa wood is used in the bend area than that employed in the remaining sections of the laminated structure to provide additional strength at this critical area.

Core sections 11 and 12 are bonded to core section 16 which has been specially arranged, as described above, and inserted in the area where the sharp bend is anticipated. In the curing stage the sandwich assembly is formed in a jig and placed in a mold of the desired shape so that simultaneously with the curing the proper contours of the composite panel will be maintained. For a complete explanation of the bending and curing of an airfoil assembly reference may be had to copending patent application Serial No. 20,126 filed April 9, 1948. As a result of the improved core section 16 above described, when it is desired to bend a panel to form an airfoil leading edge section 13, as for example, in Fig. 4 the likelihood of rupture at the bend line is greatly diminished and a perfectly smooth exterior surface is obtained, regardless of how sharp the bend may be while enhancing the strength of the airfoil section. The particular advantage of having the annual growth lines 22 and the bond lines 23 of the core pieces disposed generally perpendicular to the bend axis will be readily apparent when it is noted that this arrangement eliminates any lines of weak cleavage in the wood lengthwise of the bend axis on which the core can split during bending. The high density bond lines between the core pieces 17 in section 16 running across the bend axis act like reinforcing ribs, and distribute the bending stresses over the bend area.

The fibers of soft wood such as balsa are composed of a plurality of thin walled tubes. Therefore, in a core material wherein the grain ends are adjacent to the metal surface sheets, bending is facilitated by the ability of the fibers to be readily flexed perpendicular to the grain. Additionaly with the annual growth lines in adjacent pieces 17 and the bond lines between the pieces 17 transversely disposed with respect to the bend axis a—a, which is achieved herein by arranging these growth lines and bond lines generally perpendicular to the bend axis, irregular strain and stress is eliminated upon subsequent molding, bending and curing. By having the core substantialy normalized in this manner the outer surface of a panel will not deform either during bending or after. Since the metal surface sheets are firmly bonded to the core, any shearing actions adjacent the facing sheets are confined to the portion 16. Therefore the inner surface of the core piece 16 is under compression while the outer surface has no load imposed thereon due to its bond to the outer facing sheet. Because of this compresison of the inner surface of portion 16, it has been found that by having growth and bond lines running transverse to the bend axis less splitting and cracking of the core occurs at the bend. Also, since the plane of the bonding surfaces between core pieces is perpendicular to the bend axis of the leading edge of the aerodynamic surface being fabricated, the leading edge is strengthened and stiffened against any forces that might act against it.

As a result of this invention, a laminated sandwich construction is provided having extreme lightness and rigidity. Further, as a result of carefully arranging the annual growth lines in core pieces 17 and the bond lines between these pieces transversely with respect to the bend axis in the core section 16, certain difficulties have been overcome in making these sharp bends. Previously where no attention was paid to the plan form of the annual growth lines and the bonding lines between core sections, the irregularity of said lines created undersirable stresses in the core sections resulting in deformities in the outer surface and decreased strength.

It will also be evident that in addition to the advantages mentioned above the laminated structures produced are particularly suitable to aircraft construction involving sharply bent airfoil sections, combining the advantages of smooth outer surfaces, light weight and rigidity.

While only one embodiment of the invention has been illustrated it will be understood that the invention is not limited to the structure shown, but that the structure and method of production may be modified without departing from the scope of the invention as defined in the appended claims.

What it is desired to secure by Letters Patent is:

1. A laminated composite article adapted to be bent about an intermediate axis to form the leading edge of an airplane wing or other sharply curved surface comprising, spaced surface sheets of metal and an intermediate core sheet of wood consisting of a plurality of adhesively bonded wood pieces the pieces along the bend axis having the bond lines therebetween generally parallel to the annual growth lines of said pieces and having both said bond lines and said annual growth lines substantially perpendicular to the axis of bend, and said core sheet having the ends of the grain abutting said metal surface sheets and permanently bonded thereto.

2. A laminated composite panel adapted to be bent to form the leading edge of an airplane wing or other sharply curved surface comprising, spaced surface sheets and a core sheet of wood spacing said surface sheets and having the ends of the grain abutting the surface sheets and permanently adhesively bonded thereto, said core sheet comprising a plurality of adhesively connected pieces of wood, the adjacent pieces along the bend axis having their annual growth lines running generally perpendicular to said axis.

3. A laminated composite panel adapted to be bent to form the leading edge of an airplane wing or other sharply curved surface comprising, spaced surface sheets of metal and an intermediate core sheet of wood spacing said metal sheets and having the ends of the grain thereof abutting said surface sheets and permanently adhesively bonded thereto, said core sheet comprising a plurality of adhesively bonded pieces of wood, including adjacent pieces arranged along the bend axis having both their bond lines and their annual growth lines extending across and generally perpendicular to said bend axis.

4. A laminated composite article comprising, spaced metal sheets, a core of wood disposed between said sheets having the ends of the grain abutting said sheets and permanently bonded thereto, said core comprising a plurality of adhesively bonded cross sectional pieces having the annual growth lines of said pieces substantially parallel to parallel bond lines between said pieces.

5. A laminated composite body of airfoil shape having inner and outer metal sheets and an intermediate core sheet of wood spacing said metal sheets, said core sheet comprising a plurality of pieces of wood of a length along the grain equal to the spacing between said surface sheets having adjacent pieces adhesively bonded together along the grain and having the ends of the grain abutting and adhesively bonded to said metal sheets, said core sheet having a plurality of parallel rectangular pieces disposed in the area of greatest bend in which the bond lines between the pieces are perpendicular to the axis of said bend and the annual growth lines of the several pieces along said axis are transversely disposed relative to said axis.

6. A core sheet for laminated articles having sharply bent surfaces, comprising a plurality of pieces of wood having a length along the grain equal to the thickness of the sheet and having adjacent pieces adhesively bonded together with the ends of the grain forming the major surfaces of the sheet, the several pieces comprising said core sheet, with the exception of a special section in the vicinity of the bend axis, having different cross sectional areas and the bond lines between the several pieces being arranged at random, said special section comprising a row of elongated pieces arranged in side-by-side relation along the bend axis with the annual growth lines and the bond lines between the sections comprising said row running lengthwise of said pieces and also transverse to the bend axis.

7. A wood core sheet for a sharply bent composite laminated panel having its end grain forming the major surfaces of the sheet and having a length along the grain equal to the thickness of the sheet, said core sheet comprising a plurality of rectangular pieces bonded together and arranged at random in the relatively flat portions of said panel and said core sheet also having a plurality of aligned rectangular pieces in the area to be sharply bent, having the bond lines between said aligned pieces and the annual growth lines of said aligned pieces substantially parallel to each other and also substantially perpendicular to the bend axis.

RAYMOND G. WINNICK.

REFERENCES CITED

The following references are of record in the file of this patent:

UNITED STATES PATENTS

| Number | Name | Date |
|---|---|---|
| 1,734,826 | Pick | Nov. 5, 1929 |
| 1,789,288 | Auld | Jan. 20, 1931 |
| 2,243,432 | Mautner | May 27, 1941 |
| 2,306,295 | Casto | Dec. 22, 1942 |
| 2,369,006 | Banks | Feb. 6, 1945 |
| 2,373,500 | Pearce | Apr. 10, 1945 |
| 2,407,867 | Buchanan | Sept. 17, 1946 |

FOREIGN PATENTS

| Number | Country | Date |
|---|---|---|
| 362,925 | Great Britain | Nov. 30, 1931 |
| 559,528 | Great Britain | Feb. 23, 1944 |